United States Patent [19]
Lee

[11] Patent Number: 5,466,383
[45] Date of Patent: Nov. 14, 1995

[54] PROCESS FOR TREATING SLUDGES

[75] Inventor: Kunmo Lee, Seoul, Rep. of Korea

[73] Assignee: Samsung Engineering & Construction Co., Ltd., Seoul, Rep. of Korea

[21] Appl. No.: 178,164

[22] Filed: Jan. 6, 1994

[30] Foreign Application Priority Data

Nov. 30, 1993 [KR] Rep. of Korea .................... 26193

[51] Int. Cl.$^6$ .................................................. C02F 1/00
[52] U.S. Cl. ................. 210/774; 210/769; 210/770; 210/771; 210/180; 48/197 A.; 48/197 R
[58] Field of Search ................... 210/769, 770, 210/774, 180, 771; 201/17; 48/197 A, 197 R; 208/13

[56] References Cited

U.S. PATENT DOCUMENTS

| | | | |
|---|---|---|---|
| 3,886,048 | 3/1975 | Selmeczi et al. ................... | 201/17 |
| 4,270,928 | 6/1981 | Frischmuth ....................... | 201/17 |
| 4,321,150 | 3/1982 | McMullen ........................ | 210/769 |
| 4,511,459 | 4/1985 | Yan et al. ........................ | 208/127 |
| 4,618,735 | 10/1986 | Bridle et al. . | |
| 4,657,681 | 4/1987 | Hughes et al. .................... | 210/770 |
| 5,246,599 | 9/1993 | Aicher ............................ | 210/774 |
| 5,292,442 | 3/1994 | Khan et al. ...................... | 210/770 |

*Primary Examiner*—Ana M. Fortuna
*Attorney, Agent, or Firm*—Lowe, Price, LeBlanc & Becker

[57] ABSTRACT

A process and apparatus for treating dried sludge comprising organic material, inorganic material and heavy mertals. The process comprises indirectly heating the sludge in the absence of oxygen to a temperature of from 300° to 550° C. for volatilization of organic material and heating the residual char in the absence of oxygen to a temperature of from 750° C. to 1000° C. together with injecting steam for gasifying non volatile organic carbons in theresidual char, whereby the organic material in the sluge is converted into energy-containing products. The heavy metals remain in the ash as metal-sulfide complexes which are not soluble in acdidic water.

1 Claim, 2 Drawing Sheets

PROCESS FOR TREATING SLUDGES

FIELD OF THE INVENTION

This invention relates to a process of treating sludges and an apparatus for carrying out the process. Particularly, this invention relates to a process and an apparatus for the conversion of dried sludge organic material into energy-containing products without creating pollution problems.

DESCRIPTION OF THE PRIOR ART

Sewage and other wastewater sludges comprise organic material and inorganic material and heavy metals. The statistical data in the year 1991, showed that dried sludge of about 580 ton/day was produced from four wastewater treatment plants in Seoul, Korea. Accordingly, sludge treatment is a serious matter to be solved.

There have been various proposals for treating sludge. Among them, landfilling has been employed extensively, which causes problems that the organic material contained therein is decomposed to produce a bio-gas with an offensive filthy odor and water soluble heavy ions ooze out of the buried sludge to cause contamination of the soil and ground water pollutions. Furthermore, a landfilling treatment requires a broad filled-in land and also meets with neighbours' opposition. Thus, further treatments of sludge, e.g., incineration and pyrolysis were proposed.

U.S. Pat. No. 4,321,150, issued Mar. 23, 1982 to Frederick G. McMullen discloses a process for wastewater treatment and wastewater sludge conversion of the treated material an/or comminuted organic solid wastes into a combustible gas, tars, oils and other energy by-products.

U.S. Pat. No. 4,618,735, issued Oct. 21, 1986 to Trevor R. Bridle discloses a process and an apparatus for the conversion of sludge into oil products.

The char produced from the pyrolysis treatment of sludge contains heavy metal sulfides. However, in the incineration of the char, a part of the heavy metal sulfides is decomposed into free heavy metals which are volatilized in the air and the remainder is converted into heavy metal oxides easily soluble in acidic water. Accordingly, the landfilling of char is not desirable in view of recovering the potential energy which is about 30-50% of the sludge potential energy and large amount of char which is about 55-70% by weight of the sludge. Furthermore, an expensive scrubbing system is required in the incineration of the char to remove the volatilized free heavy metals from the flue gas being discharged into the atmosphere.

SUMMARY OF THE INVENTION

It is the objective of the invention to provide a process and an apparatus for the conversion of dried sludge to recover energy contained therein together with the disposal of the ash containing heavy metals in a stable form.

In accordance with the present invention, it is provided that a process for the conversion of dried sludge comprising the steps of: heating indirectly the dried sludge in the absence of oxygen to a temperature of from 300° C. to 550° C. for the volatilization of organic material in the sludge, thereby producing combustible gaseous products and a residual char; and heating the residual char in the absence of oxygen to a temperature of from 750° C. to 1000° C. with superheated steam for the gasification of nonvolatile organic carbons in the residual char, whereby combustible gaseous products are obtained and heavy metals complexed with sulfides which are not soluble in acidic water.

BRIEF DESCRIPTION OF THE DRAWINGS

A preferred embodiment of the invention will now be described with reference to the accompanying drawings, wherein.

DETAILED DESCRIPTION OF THE INVENTION

The process in accordance with the present invention employs raw sludge solids prepared by dewatering and drying operations in a conventional wastewater treatment plant. The raw sludge comprises organic material and inorganic materials containing silt, grit, clay and lower levels of heavy metals such as Cd, Cr, Zn, Cu, Fe and etc. in oxides soluble in an acidic water. The organic material comprises about 30-40% nonvolatile organic carbons.

According to the present invention, in the first heating step of the sludge solids in the absence of oxygen to a temperature of from 300° C. to 550° C., organic material is pyrolyzed, whereby about 60-70% volatile component of the organic material is converted to produce combustible gaseous products comprising non-condensible gases of CO, $CO_2$, $H_2$, $CH_4$ and $C_2H_6$, gaseous oil and vapor. However, about 30-40% organic carbons remain in a residual char, which contain about 30-50% of the sludge potential enregy.

Figure 1:
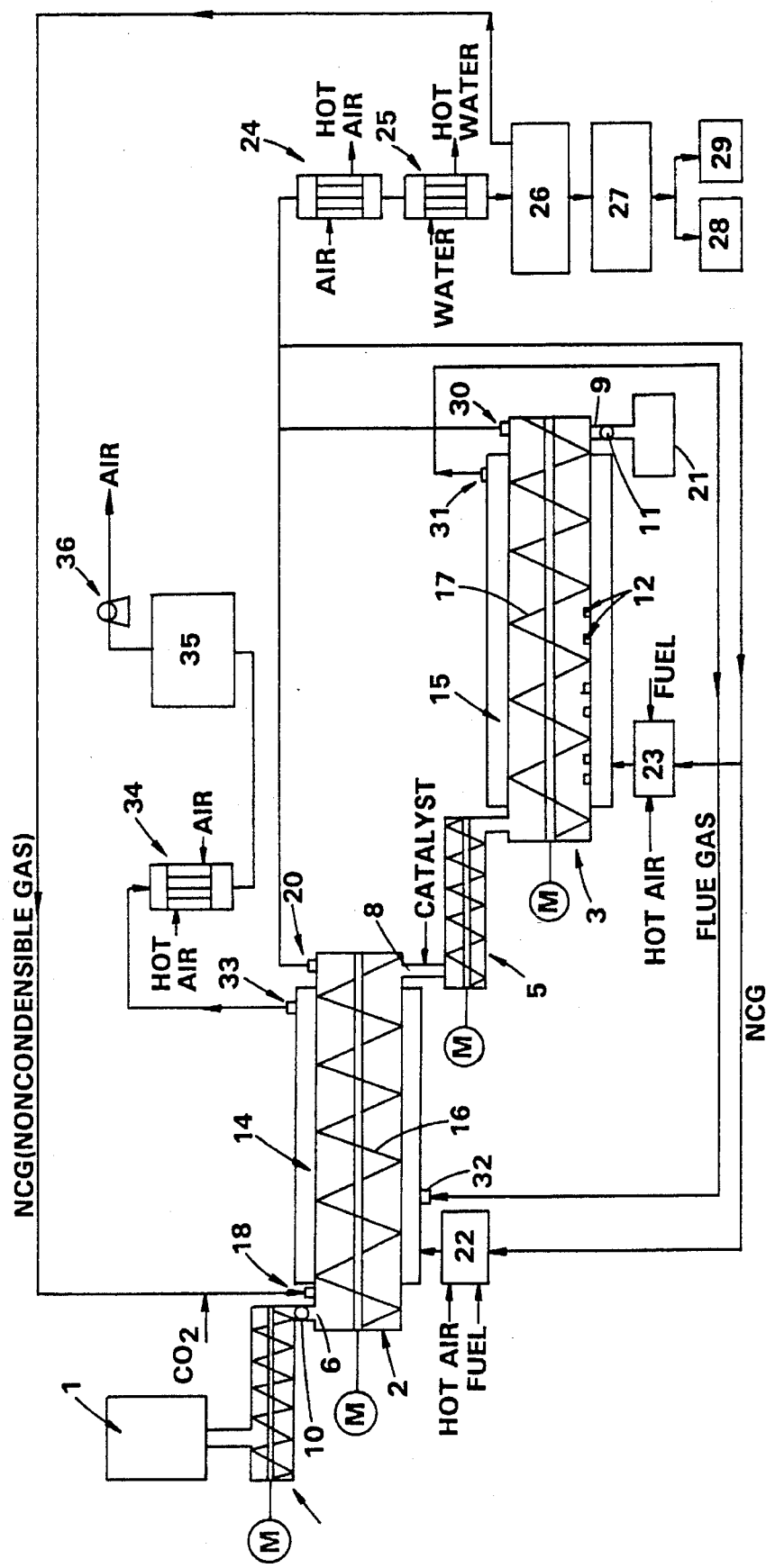
FIG. 1 is a partly schematic, partly diagrammatic view illustrating an apparatus for operating a process of the invention.

Referring to FIG. 1, an apparatus for treating sludge in accordance with the present invention includes an hopper 1, a first reactor 2 for heating the dried sludge to convert the volatile components of the organic material into the combustible gaseous products, and a second reactor 3 for the steam-gasification of the char obtained from the heating step in the first reactor 2. The hopper 1, first reactor 2 and second reactor 3 are airtightly connected through screw-type conveyors 4 and 5. Air-lock valves 10 and 11 are respectively provided between an inlet 6 of the first reactor 2 and an outlet 9 of the second reactor 3 to prevent air from incoming therein, whereby the reactors 2 and 3 and conveyors 4 and 5 are maintained in the absence of oxygen.

The reactors 2 and 3 are equipped with furnaces 14 and 15 of jacket type heating chambers. Each of conveyors 16 and 17 is incorporated in each of the reactors 2 and 3 for conveying the dried sludge or char. Furthermore, a plurality of nozzles 12 are provided in the second reactor 3 for supplying steam in the operation of steam-gasification of the char.

Prior to the heating operation in the first reactor 2, $CO_2$ gas is supplied through the port 18 for purging the reactors 2 and 3 and conveyors 4 and 5 to exclude oxygen therefrom.

The dried sludge in the hopper 1 is supplied to the first reactor 2 by the conveyor 4 and is transferred to the outlet 8 by the conveyor 16. The dried sludge in the first reactor 2 is heated to a temperature of from 300° C. to 550° C., so that the remaining 5-15% water and volatile components of the organic material are volatilized to produce noncondensible gases of CO, $CO_2$, $H_2$, $CH_4$ and $C_2H_6$, gaseous oil, vapours and char. The gaseous products are driven off through the outlet 20.

The residual char comprises inorganic material and organic carbons of 30-40% by weight of the organic material, which has 30–50% of the sludge potential energy. The heavy metals in the sludge are converted into stable metal-sulfide complexes which are not soluble in acidic water and are remained in the char.

The char is fed to the second reactor 3 by the conveyor 5 and is indirectly heated to a temperature of from 750° C. to 1000° C. with steam injected from the nozzle 12, whereby the organic carbons are gasified in the absence of oxygen. The steam-gasification of the organic carbons is performed in the following reactions:

$$C(s)+H_2O(g) \rightarrow CO(g)+ H_2(g)$$

The following reactions occur between CO and $H_2$.

$$CO(g)+H_2O(g) \rightarrow H_2(g)+CO_2(g)$$

$$CO(g)+3H_2(g) \rightarrow CH_4(g)+H_2O(g)$$

At the same time, the organic carbons are gasified in the following reactions with $H_2$ and $CO_2$ $$C(s)+2H_2(g) \rightarrow CH_4(g)$$

$$C(s)+CO_2(g) \rightarrow 2CO(g)$$

Catalysts such as $Na_2CO_3$ and dolomite may be employed in the steam-gasification of the organic carbons, so that the gasification is performed in a shortened reaction time and to a lowered temperature. The reduction efficiency of the organic carbons by the gasification is affected by the reaction time, temperature, catalysts and injection of steam as shown in Table 1, of which process data is obtained from a bench scale reactor in accordance with the process of the present invention.

TABLE I

|  | No Steam Injection |  |  |  |  | Steam Injection (C/S 1:20) |  |  |  |  |
|---|---|---|---|---|---|---|---|---|---|---|
| Temperature (°C.) | 700 | 725 | 750 | 775 | 800 | 700 | 725 | 750 | 775 | 800 |
| Char |  |  |  |  |  |  |  |  |  |  |
| Char + Dolomite | 24.9 | 37.7 | 43.4 | 57.2 | 63.5 | 39.4 | 44.4 | 73.1 | 81.7 | 91.8 |
| Char + Na2CO3 | 29.4 | 36.9 | 42.5 | 56.9 | 65.5 | 37.7 | 47.0 | 80.2 | 89.7 | 100.0 |
| Char + Na2CO3 | 41.2 | 49.5 | 79.1 | 91.7 | 100.0 | 49.5 | 73.4 | 100.0 | 100.0 | 100.0 |

(C/S: Organic Carbons in Char vs. Anount of Steam by weight)

Table 1 shows the reduction efficiency of organic carbons in the char increases with the use of dolomite or $Na_2CO_3$ in the gasifications, especially shows 100% reduction efficiency of the organic carbons at a temperature of 750° C. and above under the steam injection. Under the condition of no injection of steam, the use of dolomite did not affect the reducing rate, which suggests that dolomite or similar materials thereto is contained in the inorganic material of the char. The use of catalysts increases the cost of the sludge treatment and it is therefore needed to obtain the optimum operation conditions without catalysts.

TABLE 2

|  | Temp. (°C.) |  |  |  |
|---|---|---|---|---|
| Time (min) | 800 | 850 | 900 | 950 |
| 15 | 44.7 | 51.0 | 56.8 | 65.5 |
| 30 | 46.1 | 52.0 | 63.1 | 72.3 |
| 60 | 50.0 | 59.1 | 69.7 | 85.1 |

TABLE 2-continued

|  | Temp. (°C.) |  |  |  |
|---|---|---|---|---|
| Time (min) | 800 | 850 | 900 | 950 |
| 90 | 51.5 | 65.7 | 76.5 | 85.8 |

(No injection of steam)

TABLE 3

|  | C/S |  |  |  |  |
|---|---|---|---|---|---|
| Temp (°C.) | No steam | 1:1 | 1:5 | 1:10 | 1:20 |
| 900 | 69.7 | 75.6 | 77.9 | 90.1 | 94.3 |
| 950 | 85.1 | 87.1 | 87.1 | 98.5 | 98.7 |
| 1000 | 94.0 | 97.1 | 97.1 | 100.0 | 100.0 |

1) Operation Time: 60 min.
2) C/S Organic Carbons in Char vs. Anount of Steam by weight The influence of the steam injection on the reduction efficiency of the organic carbons was measured by gasifying a char without catalyst in a bench scale reactor. The char was obtained from pyrolyaing sludge for 25 minuters, at 500° C. Table 2 shows various reduction efficiency of the organic carbons in the char according to the conditions of different reaction times and gasification temperatures with no injection of steam, while Table 3 shows various redution efficiency according to the conditions of different injection rates of steam and gasifying temperatures.

In Table 2, the increase of reduction efficiency of the organic carbons in the char by the change of reaction time is about 20% at 950° C., while the increase by the change of reaction temperature is about 35% at the reaction time of 60 minutes. Accordingly, Table 2 shows that the reduction efficiency is affected by the gasification temperature rather than the reaction time.

Table 3 show that the reduction efficiency of the organic carbons is increased significantly under the steam injection of C/S (organic carbons/ steam) 1:10 than 1:1 or 1:5, at 900° C. from the fact that the reduction efficiency is increased by 12.2% between the steam injection of C/S 1:5 and 1:10 at 900° C., while the reduction efficiency is increased by 2.3% between the steam injections of C/S 1:1 and 1:5. However, the increase is 4.2% at C/S 1:20. Accordingly, Table 3 indicates the steam injection highly affects on the degree of gasification of the char.

The heavy metal sulfides contained in the char remain intact through the steam gasification of the char due to the absence of oxygen in the second reactor. Accordingly, the heavy metals are discharged in stable metal-sulfide complexes which are not soluble in an acidic environment. Finally, ash is discharged from the outlet 9 of the second reactor 3 through the air lock valve 11 to the tank 21. The ash is defined as inorganic material contained in the sludge since all the organic material is volatilized and gasified.

Non-condensible gases of CO, $CO_2$, $CH_4$, $C_2H_6$ and $H_2$, and gaseous oil and vapour produced in the first and second reactors 2 and 3 are discharged from the outlets 20 and 30 and led to the burners 22 and 23 of the furnaces 14 and 15 for use as a fuel gas. The remaining gases are led to a gas storage tank 26 through the heat exchangers 24 and 25. The condensible gases are condensed at the storage tank 26 and separated into oil and water which are respectively stored in an oil tank 28 and a water tank 29. The oil may be used as a fuel and the water is discharged to a wastewater treatment plant. The non-condensible gasees stored in the tank 26 may be used as purge gas in the reactors 2 and 3.

The flue gas discharged from the outlet 31 of the furnace 15 of the second reactor 3 is diverted to the inlet 32 of the furnace 14 of the first reactor 2, whereby the heat energy of the flue gas of 750°–1000° C. can be used for heating the first reactor 2 to 300°–550° C. The flue gas from the outlet 33 of the furnace 14 is discharged by a fan 36 via a heat exhanger 34 and a scrubber 35 to the atmosphere.

Figure 2:
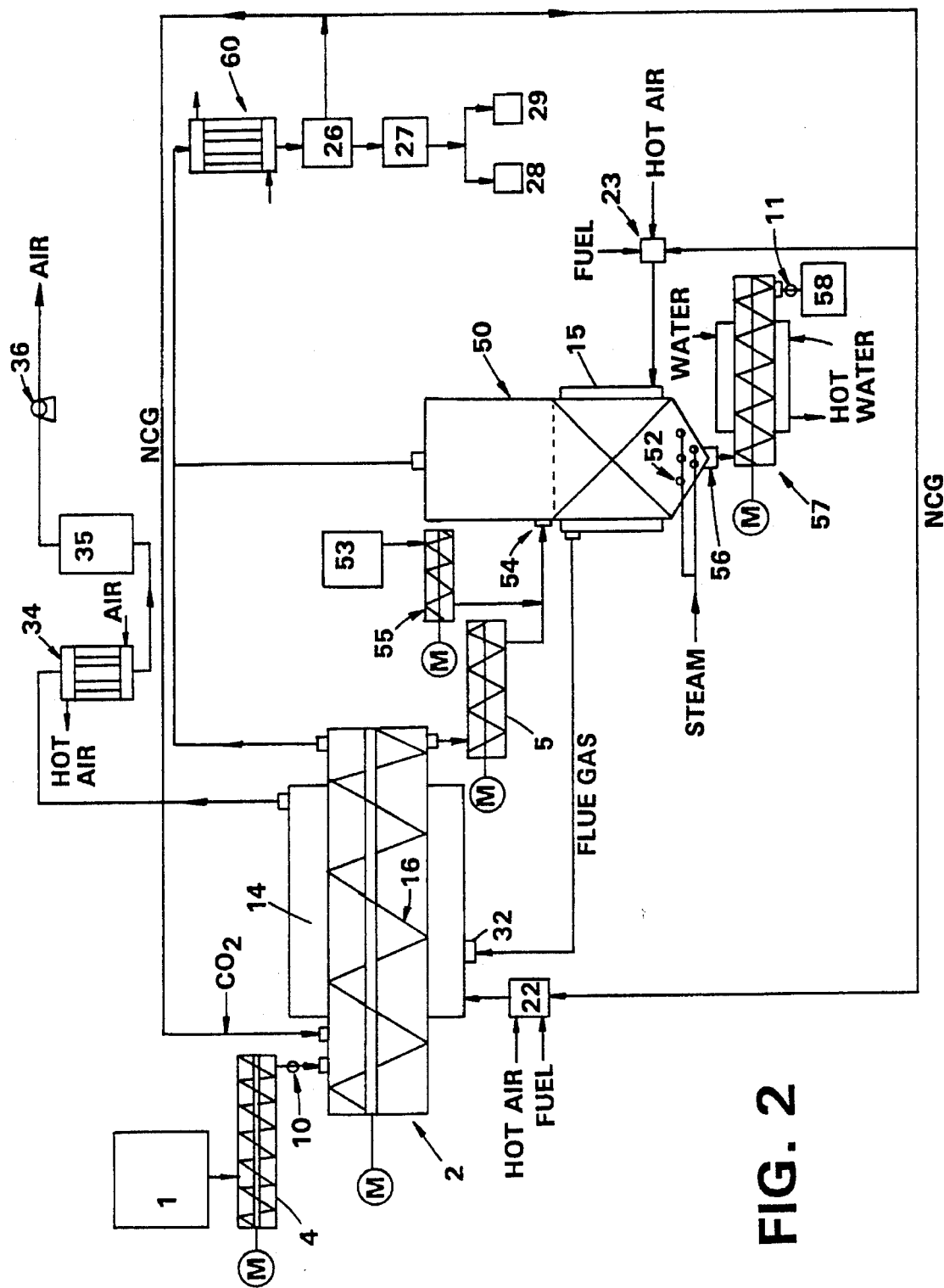
FIG. 2 shows a modification of the apparatus in FIG. 1.

FIG. 2 shows a modified apparatus for treating the dried sludge in accordance with the present invention, which is different from the apparatus in FIG. 1 in that the second reactor 50 is an expanded bed type reactor having a manifold 52 provided with a plurality of nozzles for injection of steam. In the expanded bed type reactor 50, the char expanded by the injection of steam for facilitating the steam-gasification of the char.

The char produced by the pyrolysis of sludge in the first reactor 2 is fed by the conveyor 5 to the inlet 54 at the upper portion of the second reactor 50 and is dropped on the bottom. The dropped char is expanded by the steam injected form the nozzles of the manifold 52, thereby extending the contact time of char with steam to facilitate the gasification of the char.

The ash produced from the gasification of the char in the second reactor 50 is discharged from the outlet 56 and fed to the storage tank 58 by the conveyor 57. A jacket-type heat exchanger 59 is provided in the conveyor 57 to recover the heat energy from the discharged ash of 750°–1000° C. An air lock valve 11 is provided between the storage tank 58 and the conveyor 57 prevent air from flowing in the conveyor 57 and second reactor 50 so that the heavy metals sulfide complexes are not oxidized.

Furthermore, in the apparatus in FIG. 2 the non-condensible gases, gaseou oil and vapour are fed via a heat exchanger 60 to a storage tank 26, from which the combustible gases are fed to the burners 22 and 23.

In accordance with the present invention, the potential energy in the sludge is completely recovered by the char gasification without causing environmental pollutions and discharged ash to be disposed of is minimized.

What is claimed is:

1. A process of treating sludge containing organic material comprising:

indirectly heating the sludge in the absence of oxygen to a temperature of from 300° C. to 550° C. for volatilization of the organic material, thereby producing combustible gaseous products and a residual char, and indirectly heating the residual char in the absence of oxygen for the gasification of nonvolatile organic carbons in the char, which do not create pollution, wherein the char is indirectly heated to a temperature of from 750° C. to 1000° C. with superheated stem injected in the range of 5 to 10 times as much as the amount of organic carbons contained in the char, whereby the organic carbons are converted into combustible gaseous products and heavy metals remain in the ash as insoluble metal-sulfide complexes.

* * * * *